United States Patent [19]

Schabert et al.

[11] Patent Number: 4,953,580
[45] Date of Patent: Sep. 4, 1990

[54] BOLTED PIPE JOINT RELEASABLE BY REMOTE CONTROL AND COMBINATION TOOL THEREFOR

[75] Inventors: Hans-Peter Schabert, Erlangen; Erich Strickroth, Buckenhof; Erwin Laurer, Moehrendorf, all of Fed. Rep. of Germany

[73] Assignees: Siemens Aktiengesellschaft, Hanover; Deutsche Gesellschaft für Wiederaufarbeitung von Kernbrennstoffen mbH, Munich, both of Fed. Rep. of Germany

[21] Appl. No.: 219,979

[22] Filed: Jul. 15, 1988

[30] Foreign Application Priority Data

Jul. 15, 1987 [DE] Fed. Rep. of Germany ....... 3723386

[51] Int. Cl.[5] ............................................. F16L 55/00
[52] U.S. Cl. ........................................ 285/23; 285/24; 285/39; 285/334.2; 285/368; 285/920
[58] Field of Search ................. 285/39, 368, 412, 920, 285/333, 334, 334.2, 23

[56] References Cited

U.S. PATENT DOCUMENTS

| 1,497,497 | 6/1924 | Gapp | 285/368 |
| 1,852,279 | 4/1932 | Armacost et al. | 285/412 |
| 2,423,762 | 7/1947 | Everett | 285/333 |
| 3,219,370 | 11/1965 | Moberg | 285/368 |
| 4,200,312 | 4/1980 | Watkins | 285/920 |
| 4,603,889 | 8/1986 | Welsh | 285/39 |

FOREIGN PATENT DOCUMENTS

| 0116488 | 8/1984 | European Pat. Off. . |
| 0208969 | 1/1987 | European Pat. Off. . |
| 1252483 | 4/1968 | Fed. Rep. of Germany . |
| 2258858 | 6/1974 | Fed. Rep. of Germany . |
| 3223427 | 12/1983 | Fed. Rep. of Germany . |
| 3340465 | 5/1985 | Fed. Rep. of Germany . |
| 3431325 | 3/1986 | Fed. Rep. of Germany . |

Primary Examiner—Dave W. Arola
Attorney, Agent, or Firm—Herbert L. Lerner; Laurence A. Greenberg

[57] ABSTRACT

A bolted pipe joint releasable by remote control includes two flanges each being disposed at a respective one of two pipe ends. A centering aid cooperates with both of the flanges. A seal is provided for the pipe ends. A fastening screw presses the two flanges together. The fastening screw has first and second threaded regions being successively engaged upon pressing the flanges together. The first threaded region has a substantially greater pitch than the second threaded region.

29 Claims, 13 Drawing Sheets

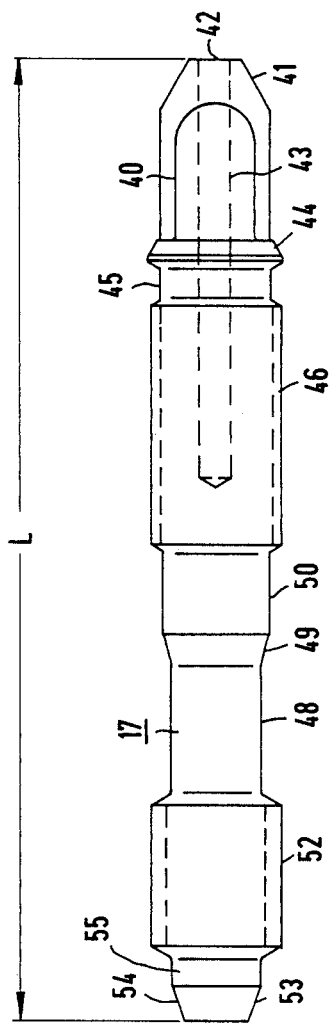
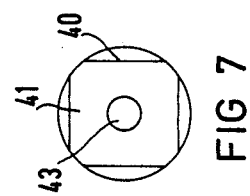

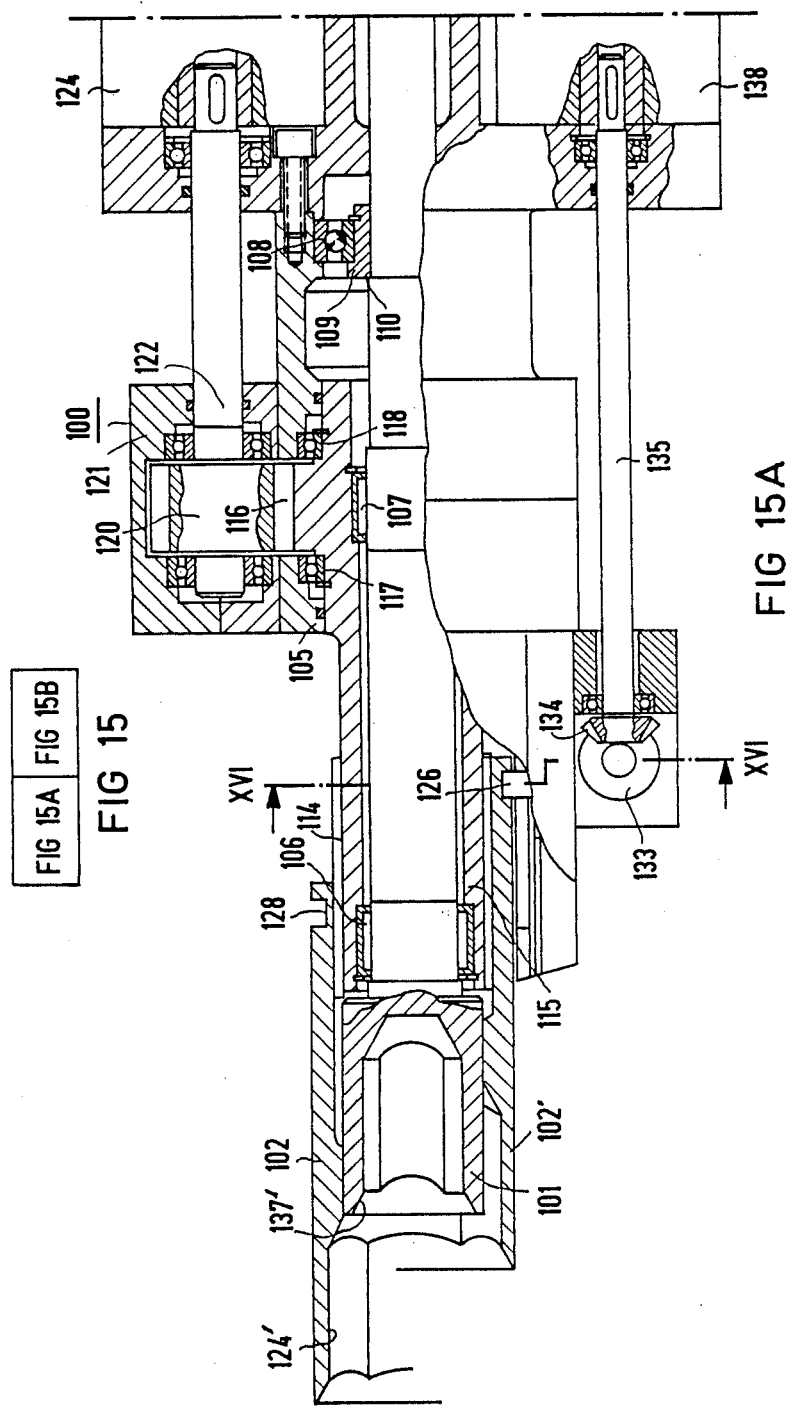

BOLTED PIPE JOINT RELEASABLE BY REMOTE CONTROL AND COMBINATION TOOL THEREFOR

The invention relates to a bolted pipe joint or pipe coupling releasable by remote control, especially for nuclear engineering plants, including two flanges each for a pipe end, a centering aid cooperating with both flanges, a seal, and a fastening screw for pressing the two flanges together.

Bolted pipe joints of the above-described type are known, such as from German Published, Non-Prosecuted applications Ser. Nos. DE-OS 32 23 427, 33 40 465 and 34 31 325. These bolted pipe joints are intended for a nuclear engineering plant, namely a plant for reprocessing spent nuclear fuels. However, such devices are quite complicated and difficult to maintain.

It is accordingly an object of the invention to provide a bolted pipe joint releasable by remote control and a combination tool therefor, which overcome the hereinafore-mentioned disadvantages of the heretofore-known devices of this general type, which have simple parts and which make maintenance easier. This is particularly important for nuclear engineering plants of the above-mentioned kind, in which there is restricted accessibility not only during normal operation but especially for repair purposes.

With the foregoing and other objects in view there is provided, in accordance with the invention, a bolted pipe joint releasable by remote control, especially for nuclear engineering plants, comprising two flanges each being disposed at a respective one of two pipe ends, a centering aid cooperating with both of the flanges, a seal, and a fastening screw pressing the two flanges together, the fastening screw having first and second threaded regions being successively engaged upon pressing the flanges together, the first threaded region having a substantially greater pitch than the second threaded region.

According to the invention, the motion necessary for closing the bolted pipe joint is divided into two segments. Of these, a first segment is rapidly traversed with the aid of the screw, because a thread of great pitch is used. At the end of this segment, the screw is anchored in the opposed flange but not yet tightened to a substantial clamping force. Subsequently, the desired high clamping force required for sealing and for transmitting pipeline bending moments is generated with the thread region of lesser pitch. This is done over a shorter distance and, because of the lesser pitch, at a correspondingly low torque. Since both segments of the motion required for closing the coupling are traversed with the aid of a single fastening screw, it is unnecessary to center a plurality of parts on one another by remote control. The "steeper" thread also prevents seizing in the nut thread of the fixed flange, so that the nut need not be interchangeable. This saves a considerable amount of space.

In accordance with another feature of the invention, the first threaded region is a relatively coarse thread having at least twice the pitch of the second threaded region which is a relatively fine thread.

In accordance with a further feature of the invention, the two threaded regions have opposing pitch directions, namely clockwise and counter clockwise. This is done in order to avoid an undesirable coupled rotation. Since the coarse thread serves the purpose of retention, while the coupling is to be clamped with the fine thread, a screw force of 200 kN can, for example, be brought to bear with ferritic screw steel.

In accordance with an added feature of the invention, the coarse thread has an axial thread play of at least 0.5 mm and preferably 2 mm or more with respect to one of the flanges in which the coarse thread is disposed. With this thread play, threading-in of the fastening screw is facilitated, so that it can also be accomplished by a remote control procedure in which the fastening screw cannot be completely precisely centered. Furthermore, such a large amount of play guarantees sufficient free mobility between the screw thread and the nut thread even in a situation where cold welding causes a buildup of material.

In accordance with an additional feature of the invention, the coarse thread is rolled. This means that a tedious, precise, metal-cutting machining is not necessary. Furthermore, rolled threads have less tendency to seize.

In accordance with yet another feature of the invention, the fastening screw has a shaft or shank portion between the threaded regions in the form of an anti-fatigue shaft. That is, it has a lesser shaft diameter and when the screw coupling is clamped it absorbs settling by means of elastic resiliency.

In accordance with yet a further feature of the invention, the anti-fatigue shaft has a thickened portion in the vicinity of the second threaded region, for centering the screw in one of the flanges. This facilitates guidance when the screw coupling is closed. The thickening also makes it possible to prevent lateral migration of the screw under the influence of asymmetrical friction forces in the nut.

In accordance with yet an added feature of the invention, one of the flanges has a threaded bore formed therein in which the first threaded region is engaged, and there is provided a sleeve supported on the other of the flanges having another threaded bore formed therein in which the second threaded region is engaged.

The sleeve is suitably attached to the fastening screw in captive fashion. For instance, in accordance with yet an additional feature of the invention, there is provided a fixed stop or collar limiting screw motion of the sleeve on the second threaded region in a direction away from the first threaded region. The collar also assures a uniquely defined outset position prior to the beginning of the clamping process and permits complete screw insertion of the coarse thread.

In accordance with still another feature of the invention, the sleeve has a double internal thread which can be screwed onto both the first and the second threaded regions. The double thread makes it possible for the fine thread to have a smaller diameter.

In a special case, both threads have the same nominal outside diameter. The sleeve is therefore rotated by the coarse thread, although the inside diameter thereof is smaller than the outside diameter of the coarse thread. The coarse thread forms coarse crosswise grooves in the fine thread, which can advantageously receive lubricants, dirt and chips and lessen its tendency toward seizing.

In accordance with still a further feature of the invention, the sleeve and the screw have flat surfaces being differently dimensioned for receiving or applying tools.

In accordance with still an added feature of the invention, the sleeve has a greater number of surfaces than the screw. The form in which the sleeve has a hexagonal head but the screw has a square head is particularly advantageous. A square head, in fact, by comparison with a hexagonal head, enables greater rotational-angle play and radial play between the flat surface or side and the tool, and this is advantageous for applying the tool to a screw that is in an inclined position. This is advantageous because the still-loose screw must first be aligned with its coarse thread. Once it is in its correct position, the tool for the sleeve nut can be applied with less play. It is also possible to provide the sleeve with a square head and the screw with a triangular one.

Independently of the number of surfaces or sides, in accordance with still an additional feature of the invention, the fastening screw has a shaft portion between the threaded regions in the form of an anti-fatigue shaft with a given diameter, and the flat surface of the screw has a blind bore formed in the center thereof and a wrench width at least 2 mm larger than the given diameter. A drilling machine which can be centered at this bore, is then firmly clamped to the flat surface or side and is used to bore out the anti-fatigue shaft once the coarse thread is firmly seated.

In accordance with another feature of the invention, one of the flanges is a releasable flange having a short length with a coarse internal thread preventing the screw from falling out during transportation of the releasable flange. Subsequently, the screw along with the sleeve can be removed easily, such as by remote control, so that screws that are hard to turn, for instance, can be changed without dismantling the flange. During maintenance, the flanges can be routinely provided with reconditioned, newly lubricated screws and sleeves.

However, other possibilities are also conceivable for fixing the fastening screw in the releasable flange. For example, in accordance with a further feature of the invention, one of the flanges is a releasable flange having an inner collar and a slit ring with a wedge cross section acting against the inner collar as a backstop for the fastening screw.

In accordance with an added feature of the invention, at least one of the flanges has a rim with protrusions thereon transmitting a screw biasing force exceeding a given required sealing force. This assures that the desired sealing force of the coupling is not substantially exceeded, yet at the same time the flanges have a rigid location relative to one another. The flanges cannot move substantially relative to one another, so that the seal remains at rest.

In accordance with an additional feature of the invention, the seal is a piece of pipe having curved sealing surfaces compensating for a radial offset.

In accordance with again another feature of the invention, the seal is a double cone seal formed of metal, preferably with a cone angle between 35° and 60°. The seal should be formed of a type of steel that is the same as that for the tubes, preferably austenite, because this is favorable in terms of the threat of corrosion and furthermore it enables a plastic deformation with only a slight force, in order to compensate for inaccuracy.

In accordance with again a further feature of the invention, there is provided a retaining ring fixing the seal to one of the flanges.

In accordance with again an added feature of the invention, the seal is countersunk in one of the flanges, so that damage to the seal during transportation of the pipe pieces can be avoided.

In accordance with again an additional feature of the invention, one of the pipe ends is a stationary pipe end, and there is provided a protruding sealing portion disposed on the stationary pipe end. This has the advantage of even permitting later processing, for example by a welding robot, or cleaning, to be performed by remote control.

In accordance with yet another feature of the invention, the sealing portion forms the centering aid.

In accordance with yet a further feature of the invention, the sealing portion is an interchangeable ring or an interchangeable bushing, in order to enable quick remedial action in the event of damage.

With the objects of the invention in view, there is also provided a bolted pipe joint assembly releasable by remote control, comprising a fitting having two sides, two bolted pipe joints each being disposed on a respective one of the sides of the fitting, and a pendulum suspension disposed above the bolted pipe joints, each of the pipe joints having two flanges each being disposed at a respective one of two pipe ends, a centering aid cooperating with both of the flanges, a seal, and a fastening screw pressing the two flanges together, the fastening screw having first and second threaded regions being successively engaged upon pressing the flanges together, the first threaded region having a substantially greater pitch than the second threaded region. With such bolted pipe joints, the fittings are attached in a readily interchangeable manner.

In accordance with another feature of the invention, the screws of the two bolted pipe joints are in the form of a common screw disposed between the two bolted pipe joints. In this way, a particularly simple attachment becomes possible. The pendulum motion also assures a favorable pre-centering.

With the objects of the invention in view, there is furthermore provided a bolted pipe joint assembly releasable by remote control, comprising a plurality and particularly three or four bolted pipe joints, the pipe joints having two common flanges disposed at a plurality of pipe ends, a centering aid cooperating with both of the flanges, a seal, and a fastening screw disposed between the axes of the pipe ends pressing the two flanges together, the fastening screw having first and second threaded regions being successively engaged upon pressing the flanges together, the first threaded region having a substantially greater pitch than the second threaded region.

The screw may be seated in such a way that the forces arising at the various bolted pipe joints are as equal as possible.

In accordance with another feature of the invention, the screw is disposed asymmetrically with respect to the axis of an individual pipe. This is made possible by the high fastening force of the screw and the bolted pipe joint according to the invention. This is a substantial advantage as compared with prior art bolted pipe joints, in which a plurality of screws are provided for one pipe.

Another advantage is that in accordance with a further feature of the invention, the flange, for example a rectangular flange, has a reduced width in a direction transverse to the plane of an outgoing pipe bend of one of the pipe ends. This is known as a jumper. This construction exploits the fact that the normally vertically extending pipes exert temperature-dictated bending moments primarily in a vertical plane, so that flattened portions of the flange do not result in any loss of strength transversely thereto.

In accordance with an added feature of the invention, one of the flanges is a multiple flange, and there is provided a common suspension strap connecting a plurality of outgoing pipes of one of the pipe ends joined in one plane. This is applicable to two, three or more pipes. In this way, they can be removed in common, without dismantling adjacent pipes.

In accordance with an additional feature of the invention, the screw is formed of a different type of material than the one flange and the sleeve, and there is provided an anti-seizing cap formed of the same material as the screw being mounted onto the sleeve. This is done in order to increase operational reliability and to avoid seizing of identical materials. The screw may for instance be formed of ferrite or martensite while the flange may be formed of austenite. An anti-seizing cap made of the same material as that of the screw, that is, again preferably ferrite or martensite, should be shrunk onto the sleeve.

With the objects of the invention in view, there is additionally provided a combination bolted pipe joint releasable by remote control and tool for operating the bolted pipe joint, the bolted pipe joint comprising two flanges each being disposed at a respective one of two pipe ends, a centering aid cooperating with both of the flanges, a seal, a fastening screw pressing the two flanges together, the fastening screw having a first relatively fine threaded region and a second relatively coarse threaded region being successively engaged upon pressing the flanges together, the first threaded region having a substantially greater pitch than the second threaded region, one of the flanges having a threaded bore formed therein in which the first threaded region is engaged, and a sleeve supported on the other of the flanges having another threaded bore formed therein in which the second threaded region is engaged, and the tool comprising a first turning mechanism for the second relatively coarse thread actuating the screw and the sleeve by turning the screw and the sleeve in common, and a second turning mechanism subsequently turning the sleeve being supporting against the screw. Even with high screw moments, this avoids impermissible torques at the flanges.

In accordance with another feature of the invention, the turning mechanisms include means or instrumentation for ascertaining the number of revolutions or the operating time and torque preferably by measuring the true power in a three-phase asynchronous motor. This is done so as to shut off the combination tool after the bolted pipe joint has been closed or opened. This makes it possible to immediately detect screws that are hard to turn and to replace them before seizing occurs.

In accordance with a further feature of the invention, the first turning mechanism includes means for providing a tap screw effect in the direction of loosening the second relatively coarse thread, preferably becoming operative if an adjustable normal torque is exceeded. Coarse threads that have seized tight can thus also be loosened.

In accordance with an added feature of the invention, there are provided means for adjusting at least one of the possible torque and the rpm of the turning mechanisms in stages, especially by limiting the current in the asynchronous motor. Low torques are desirable, for instance, when the fastening screw is being received and threaded into the coarse thread. The rpm of the turning mechanisms can also be made adjustable, for instance so as to have as low a relative speed as possible during centering or, with small screws, to attain faster operation at low torques than with large screws, which must be actuated with correspondingly great forces.

In accordance with an additional feature of the invention, there is provided a programmed stepping remote control stopping the turning mechanisms and emitting a signal upon premature increase in torque. This indicates that there is a malfunction at the fastening screw that requires special attention.

In accordance with still another feature of the invention, there is provided a wrench for the screw, and a wrench (six-sided nut) for the sleeve being axially adjustable relative to the wrench (four-sided nut) for the screw. This is done in order to use the turning mechanisms differently in an intentional manner for the two threaded regions. The six-sided nut should function as a funnel upon being withdrawn and should facilitate threading-in of the square head of the screw. Once the coarse thread has been inserted by turning, the six-sided nut, which is provided with less play, can be slipped forward over the sleeve, preferably at reduced rpm and with low torque in the opposite direction. After it has been slipped on, the sleeve is then placed under tension in the forward direction at high torque.

In accordance with a concomitant feature of the invention, the tool has a substantially smaller radial dimension on one side of the axis of the screw than on the opposite side.

Other features which are considered as characteristic for the invention are set forth in the appended claims.

Although the invention is illustrated and described herein as embodied in a bolted pipe joint releasable by remote control and combination tool therefor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIGS. 6 and 7 are respective side-elevational and end-elevational views at right angles to one another of a fastening screw according to the invention;

FIGS. 15A and 15B are portions of a side-elevational view which are partly broken-away in a longitudinal section and which together form FIG. 15 as shown in the legend in FIG. 15A, showing a combination tool for use with the bolted pipe joint according to the invention;

Figure 1:
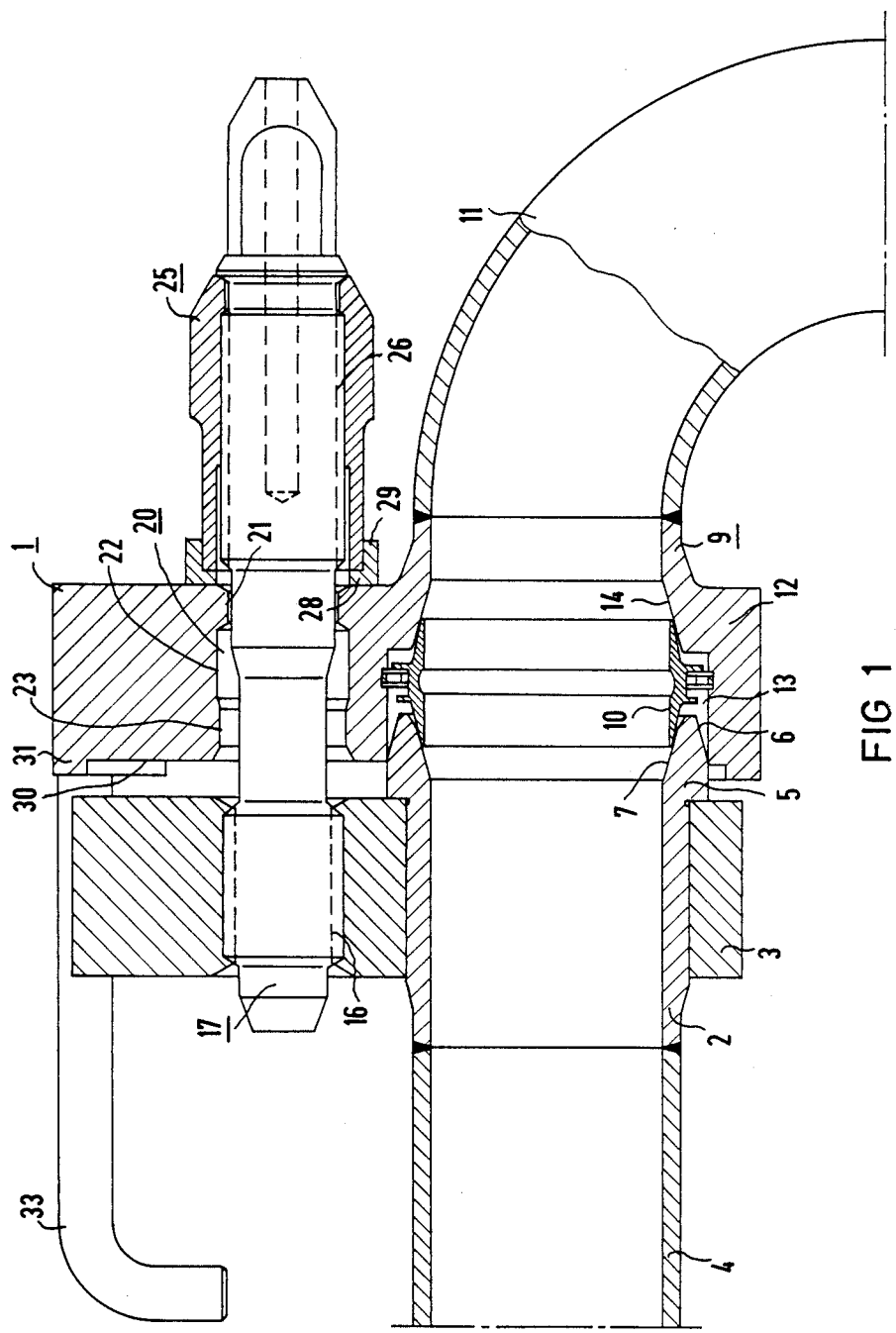
FIG. 1 is a fragmentary, diagrammatic, partly broken-away, longitudinal-sectional view of a bolted pipe joint according to the invention, having a pipe with a rated width of 65 mm (DN 65)
Figure 2:
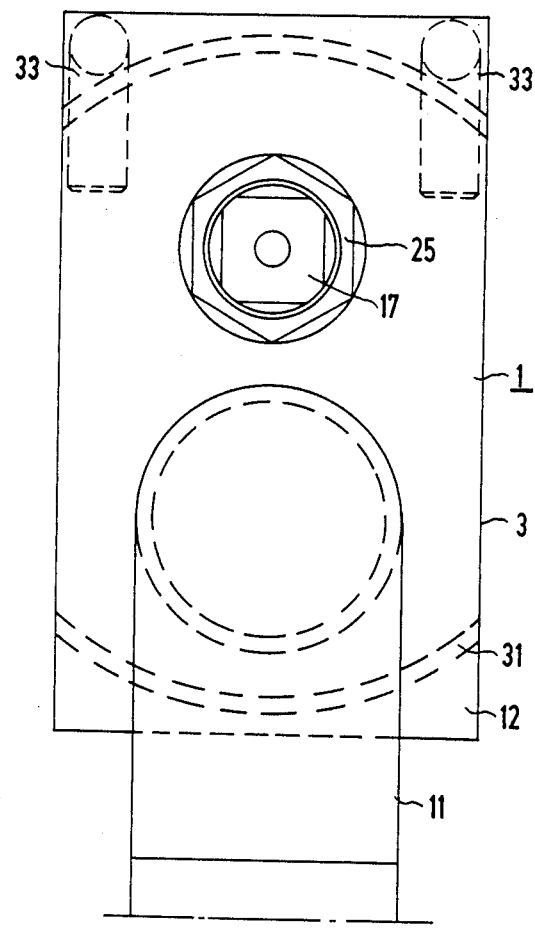
FIG. 2 is an end-elevational view of the device shown in FIG. 1.
Figure 3:
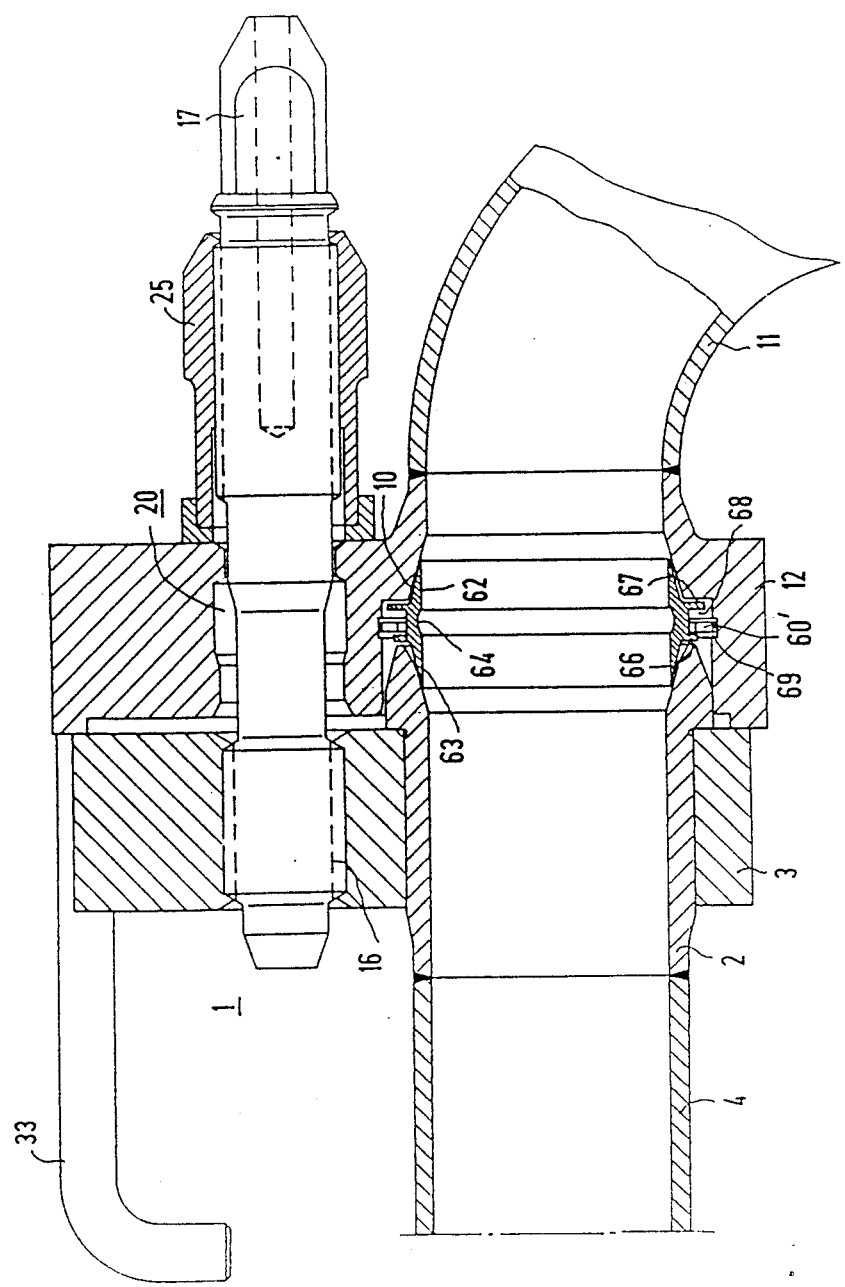
FIG. 3 is a view similar to FIG. 1 showing the device in operating position.

Referring now to the figures of the drawings in detail and first, particularly, to FIGS. 1, 2 and 3 thereof, there is seen a bolted pipe joint or pipe coupling 1 which includes a fixed pipe end 2 that is seated in a fixed flange 3 that is linearly flattened on the sides, as shown in FIG. 2. The side of the pipe end 2 facing away from the bolted pipe joint 1 is welded to a pipe 4. The pipe end 2 widens into a collar 5 that is supported on the flange 3 at the side of the flange 3 facing away from the pipe 4. The collar 5 is in the form of a centering aid having inner and outer surfaces at the free end thereof which are conically tapered to a point, producing conical surfaces 6 and 7. The angle of each conical surface is approximately 30°. The outer conical surface 6 serves to guide a counterpart 9 upon closure of the bolted pipe joint, while the inner conical surface 7 forms a bearing surface for a sealing body 10.

The counterpart 9 is an elbow that is welded to the flange 12 forming another pipe end 11. The flange 12 has a cylindrical recess 13 which fits over the collar 5. The side of the cylindrical recess 13 facing away from the flange 3 tapers into a conical region 14, which has an angle of 30° like the conical region 7 and forms a second support for the sealing body 10.

Above the pipe end 2, the flange 3 has a threaded bore 16 with a coarse thread, which is engaged by a screw 17 that will be described in detail below, in conjunction with FIGS. 6 and 7.

The screw 17 also extends through a bore 20 in the flange 12, which has a plurality of sections. A first section 21 is in the form of a coarse thread, like the thread 16 and has a length that is only approximately one-fourth of the flange thickness which is 50 mm, as seen in the direction of the thickness of the flange. The section 21 is followed by a cylindrical region 22, the length of which is approximately one-half the flange thickness. A last region 23 is again cylindrical, but a somewhat smaller diameter. Beveled portions at angles of 45° or less are provided between the sections 21, 22 and 23, particularly on the outsides of the flange 12.

A clamping sleeve 25 which has a threaded bore 26, is seated on the screw 17. The thread of the bore 26 is formed as both a fine thread and a coarse thread, as will be explained below in further detail in conjunction with FIG. 10. The sleeve 25 is supported by a dish 28 with a raised rim 29, at the side of the flange 12 facing away from the flange 3.

The side 30 of the flange 12 facing toward the flange 3 has a rim with a collar thereon forming a spacer element 31. Two hooks 33 which are also pressed into the upper surface of the flange 12, can rest against the upper rounded surface of the flange 3, as shown in FIG. 2. The hooks 33 support and center the loose flange 12 on the fixed flange 3 in such a way that the screw 17 can be screwed into the threaded bore 16.

Once the screw 17 has been screwed all the way in, the bolted pipe joint 1 is in the position shown in FIG. 1. The sleeve 25 having the thread 26 is subsequently tightened, until the collar 31 rests on the flange 3. The bolted pipe joint 1 then assumes the operating position shown in FIG. 3. In this position, the sealing body 10 is deformed in such a way that the tightness of the bolted pipe joint 1 is assured, and the spacer element 31 rests firmly on the counterpart flange 3. Further rotation of the sleeve 25 requires a considerable increase in torque, so that the termination of the closing motion can be detected with good accuracy.

Figure 4:
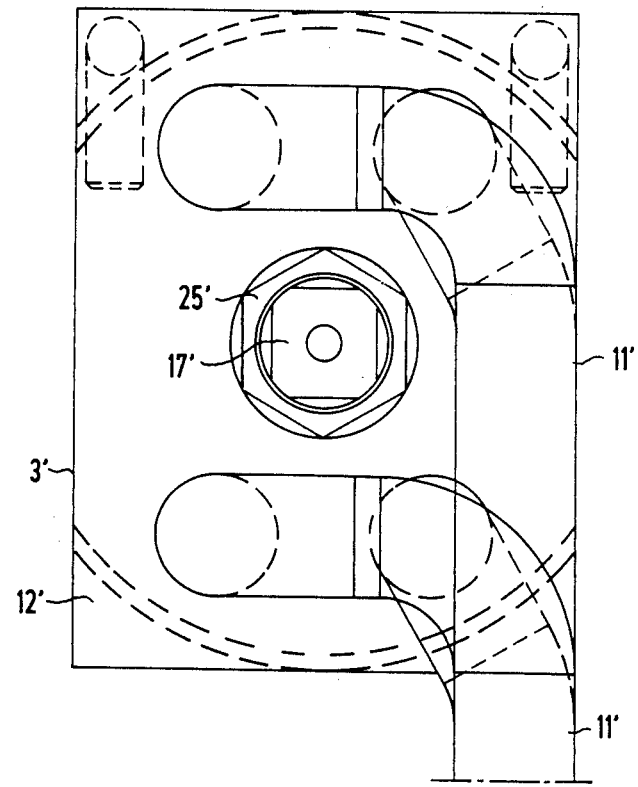
FIGS. 4 and 5 are views similar to FIGS. 1 and 2 showing a bolted pipe joint for four pipes, which have a rated width of 25 mm (DN 25)
Figure 5:
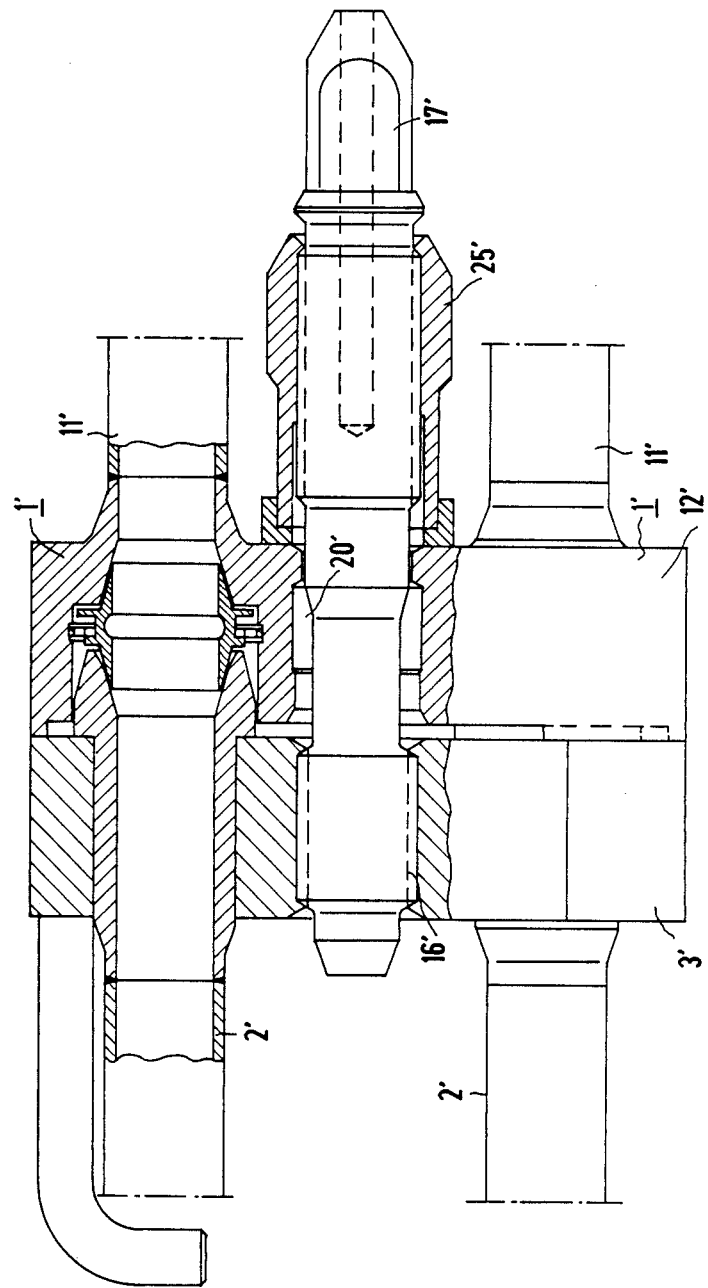

According to FIGS. 4 and 5, four pipe ends 2' and four pipe ends 11' are respectively connected to a fixed flange 3' and a loose flange 12' in bolted pipe joints 1'. The individual bolted pipe joints 1' are constructed practically like those between the pipe ends 2 and 11 of FIGS. 1–3, but the pipe diameter is much smaller, namely 25 mm, so that sufficient force for sealing can be brought to bear with one screw 17' and one sleeve 25' for the four sealing locations. It should be noted that the four pipe ends 11' of the loose flange 12' are all extended to one side, namely the right-hand side, of the screw 17'. At that location, the pipe ends extend in a plane at right angles to the plane of the drawing in FIG. 4 in a space-saving manner.

The screw 17 which is shown to scale in FIG. 6 has a length L of 270 mm. The right end of the screw 17 has a square head 40, which has a wrench width of 30 mm and a truncated cone 41 extending to the free end 42 thereof. The cone angle is 60°. A central blind bore 43 is provided in the square head 40.

Adjoining the square head 40, which amounts to approximately one-fifth of the screw length L, is a collar 44 that is widened to approximately 38 mm in diameter and is defined by two conical surfaces forming respective angles of 30° and 60° relative to the screw axis. An adjoining cylindrical portion 45 has a diameter of 30 mm and an approximate length of 10 mm. The cylindrical portion 45 provides a termination area for a thread 46, which is formed as both a coarse thread and a fine thread. The thread 46 is shown in detail on a larger scale in FIG. 10. The length of the thread portion 46 is approximately one-fourth of the screw length L.

The left side of the thread 46 is adjoined by a screw portion 48, which is formed as an anti-fatigue shaft. The anti-fatigue shaft 48 has a diameter of 25 mm and a length of approximately 40 mm. The anti-fatigue shaft 48 merges with a conical surface 49 which has a cone angle of 15°, in order to form a thickened guide cylinder 50 with a diameter of 30 mm, that is immediately adjacent the thread 46.

Figure 11:
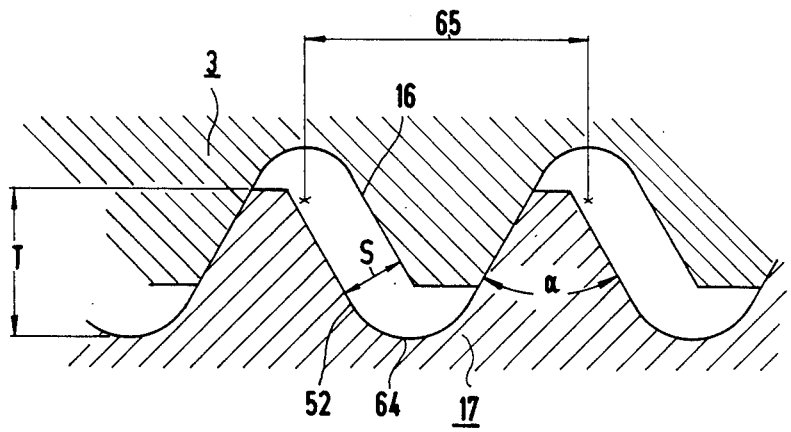

A second thread region 52 of the screw 17 which adjoins the anti-fatigue shaft 48, has a rolled coarse thread which is shown on a larger scale in FIG. 11. The length of the thread region 52 which is 40 mm, is approximately one-seventh of the screw length L. The other end 53 of the screw 17 is in the form of a truncated cone 54 having a cone angle of 20°, which begins at a short cylindrical portion 55 having a diameter of 24 mm and serves to thread the screw 17 into the threaded bore 16.

Figure 9:
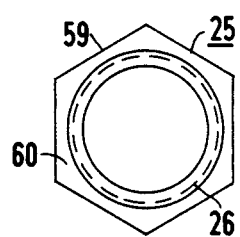
FIGS. 8 and 9 are respective longitudinal-sectional and end-elevational views of a sleeve associated with the screw.
Figure 8:
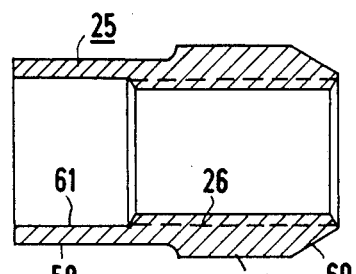

The clamping sleeve 25 shown in FIGS. 8 and 9 has an outer cylindrical portion 58 and an adjoining hexagon 59, which has a wrench width of 46 mm and is flattened to form a truncated cone 60 with an angle of 30° on the side thereof facing away from the cylindrical portion 58. The interior of the sleeve 25 contains the thread 26, which is formed as a coarse and fine structure as shown in detail in FIG. 10, over approximately 50 mm of the length thereof in the vicinity of the hexagon 59. The total length is approximately 80 mm and the remainder 61 thereof has a length of approximately 30 mm, which is cylindrical and has an inside diameter of 37 mm which is somewhat greater than the outside diameter of the thread 26.

FIG. 11, which is drawn on a scale that is approximately 10 times larger, shows the rolled coarse thread 52 of the screw 17. The rolled coarse thread 52 has a groove bottom 64 that is rounded with a radius of 1.9 mm and an internal thread diameter of 26.4 mm. The flank or side angle α of the thread is 60°. The depth T of the thread turns is 4.1 mm. The pitch 65 of the clockwise thread 52 is 8 mm. FIG. 11 also shows that there is considerable play with respect to the nut thread, as provided in the threaded bores 16 and 26. The play S is more than 1 mm.

Figure 10:
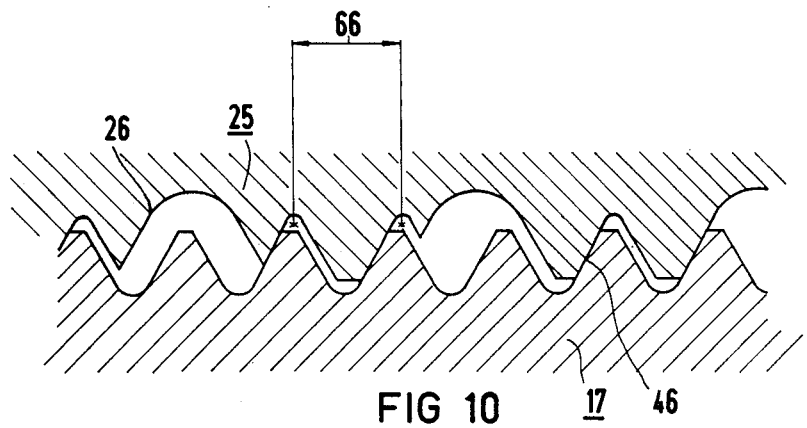
FIGS. 10 and 11 are enlarged, longitudinal-sectional views showing details of the thread of the screw and sleeve with the associated nut threads.

The counterclockwise fine thread 46 of the screw 17 is shown in FIG. 10. The pitch 66 of the thread 46 is 3 mm. The inside diameter of the thread 46 is 30.9 mm and the tooth height is 1.85 mm. As FIG. 10 shows, the fine thread 46 engages the thread 26 of the sleeve 25, which is adapted to both the coarse thread 52 and the fine thread 46. Since the fine thread is cut counterclockwise while the coarse thread 52 is cut clockwise, hollow spaces and grooves are produced in the thread region, which are capable of receiving lubricant as well as abraded material and dirt that is produced upon actuation of the threads. This lessens the likelihood that the threads will malfunction.

Figure 12:
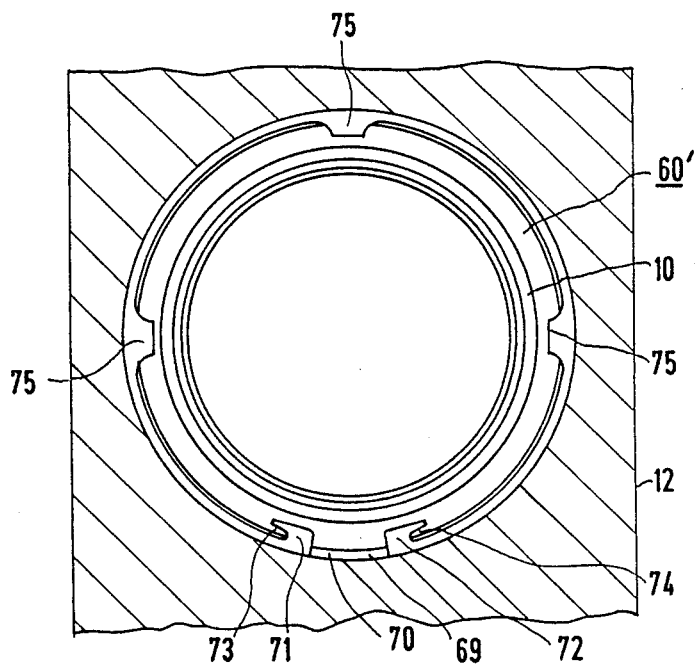
FIG. 12 is a fragmentary, cross-sectional view showing the fastening of a seal.

FIG. 12 shows a section transverse to the pipe axis for a ring 60′ which is made of spring material and is used for retention of the sealing body 10 as provided in the bolted pipe joint according to the invention. In FIG. 3 it can be seen that in the undeformed state, the sealing body 10 has two approximately cylindrical inner wall regions 62 and 63, which are separated from one another by a round groove 64 in the inner wall of the sealing body 10. In the vicinity of the round groove 64, two ribs 66 and 67 which extend at right angles to the pipe axis about the periphery of the sealing body 10 are spaced apart from one another on the outside of the sealing body 10.

A space 68 between the ribs 66, 67 is engaged by the retaining ring 60′, which is snapped into place in a groove 69 in the loose flange 12. As FIG. 12 shows, the ring 60′ has a slit 70 formed therein. Ends 71 and 72 of the ring 60′ which are oriented toward the slit 70 are provided with hook-like recesses 73 and 74. The ring 60′ can therefore be engaged with tongs and compressed. The compression reduces the diameter of the ring 60′ and permits it to be lifted out of the groove 69. On the other hand, during normal operation the ring 60′ with the thickened ends or portions 71 and 72 as well as further protrusions 75 distributed uniformly about the periphery thereof, engages the space 68 between the ribs 66 and 67 of the sealing body 10. In order to simplify the sealing ring 10, one of the ribs, namely the rib 66 facing the counterpart flange 3, can be omitted.

Figure 13:
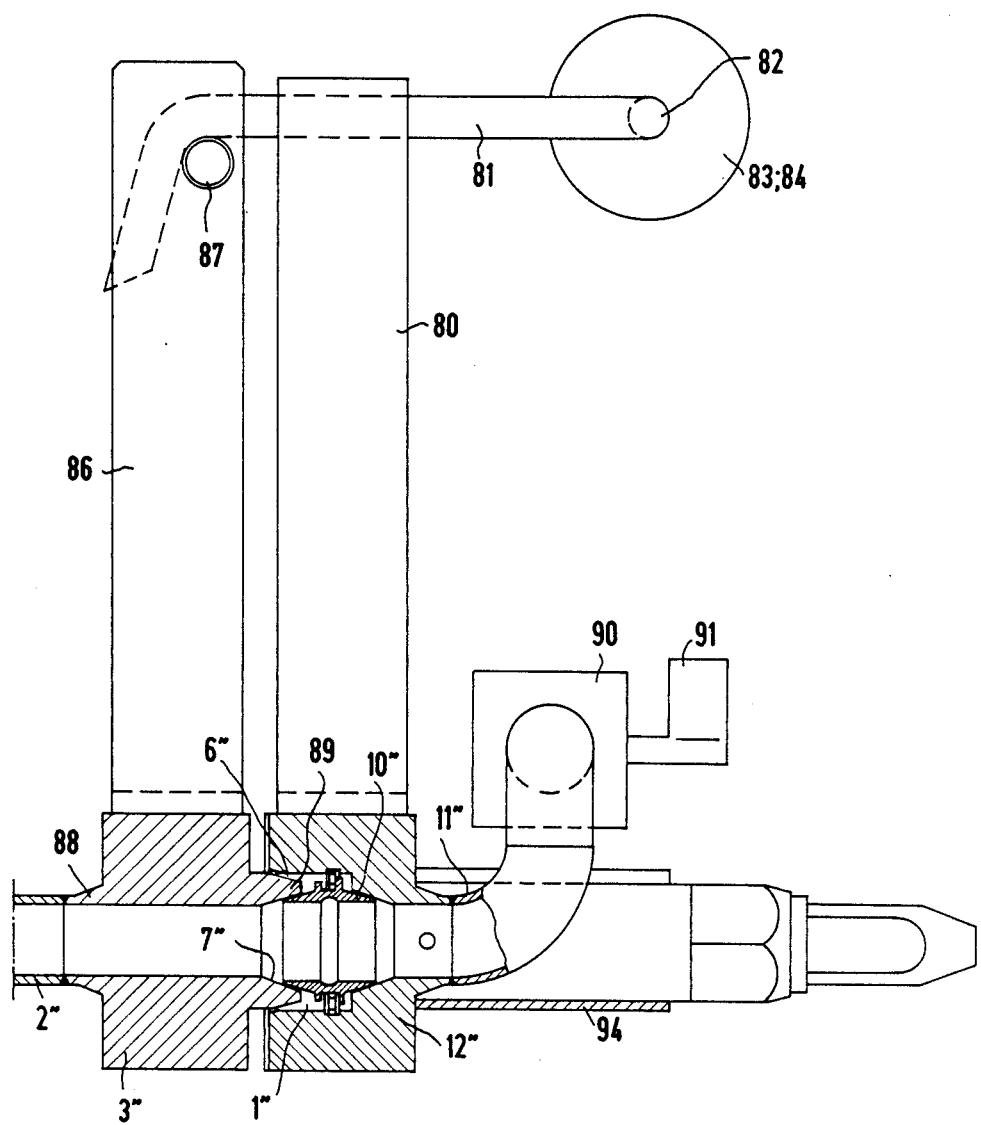
FIGS. 13 and 14 are respective partly longitudinal-sectional and end-elevational views at right angles to one another, showing an embodiment in which a fitting is disposed between two bolted pipe joints.
Figure 14:
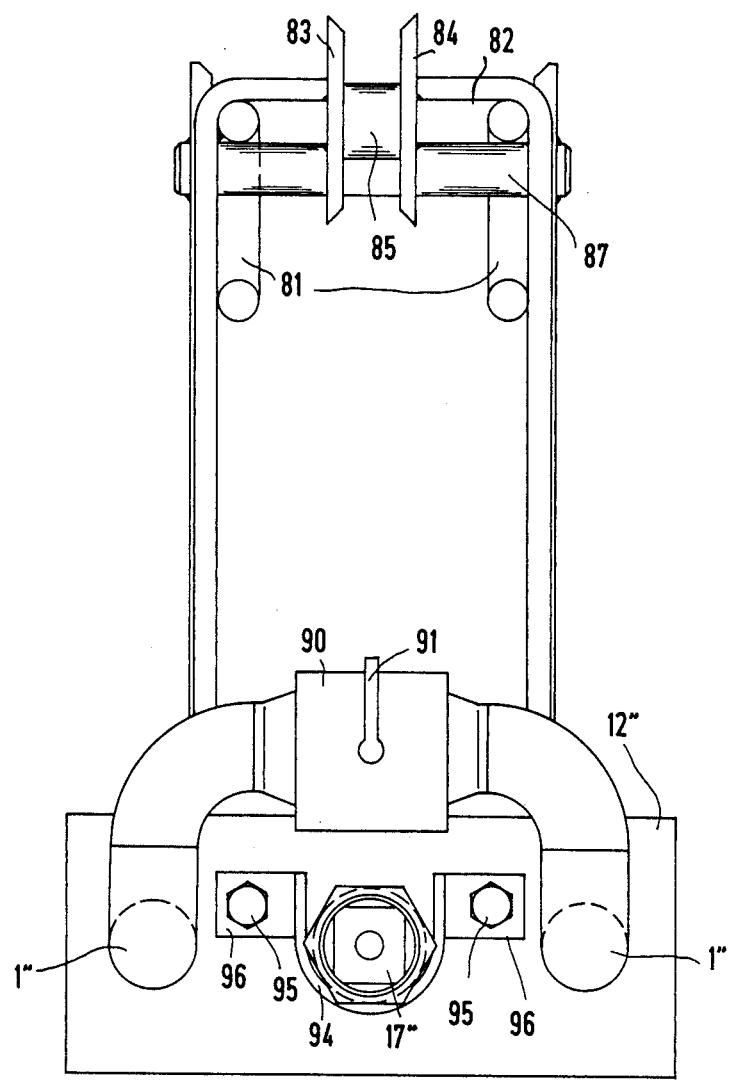

FIGS. 13 and 14 illustrate an embodiment in which a loose flange 12″ is connected through a U-shaped bracket 80 to a pair of hooks 81. The hooks are provided with a common crosspiece 82, on which two washers 83 and 84 determine an engagement point 85 for a gripper. The hooks 81 fit over a support tube 87, which is secured 86 to a fixed flange 3″ by two carriers.

The fixed flange 3″ includes two bolted pipe joints 1″ with pipe ends 2″ on one side. The pipe ends 2″ are welded onto an adapter stub 88 of the fixed flange 3″.

On the opposite side, the fixed flange 3″ has a protrusion 89 corresponding to the collar 5 with an outer conical surface 6″ providing a means of centering the loose flange 12″. An inner conical surface 7″ produces a bearing surface for a sealing body 10″.

Other pipe ends 11″ lead to a ball cock 90, which can be actuated between open and closed positions with a lever 91. The ball cock 90 can be removed and replaced after the screw 17″ has been loosened.

The fastening screw 17″ in the embodiment of FIGS. 13 and 14 is supported by a bowl 94 secured to the loose flange 12″ with screws 95 and flanges 96. The screw 17″ is held with the bowl 94 so that after being loosened it will not move out of the horizontal position, which is favorable for threading into the fixed flange 3″, even upon pivoting movements that may be exerted about the support tube or retaining rod 87 as a pivot point.

The combination tool 100 shown in FIGS. 15-18 includes a screw wrench in the form of a screw sleeve 101 (four-sided nut) engaging the screw 17 and a nut sleeve 102 (six-sided nut) associated with the sleeve 25 and seated concentrically relative to the sleeve 101. The screw sleeve 101 is directly connected with a shaft 104, which is supported in a housing 105 of the tool 100 with needle bearings 106 at one end and 107 at the other end. A ball bearing 108 has a guide element 109 which rests on a collar 110 of the shaft 104 and is used for axial fixation. A shaft end 111 protruding out of the housing 105 is engaged by a turning mechanism 103, which includes a three-phase asynchronous motor 112 and a gear 113. The motor 112 is reversible for clockwise and counterclockwise operation.

The nut sleeve 102 is seated with a sliding wedge coupling 114 on a hollow shaft 115 concentrically surrounding the shaft 104. The hollow shaft 115 has outer teeth 116 on the end thereof facing away from the nut sleeve 102. At that location, the hollow shaft 115 is supported in the housing 105 by two roller bearings 117 and 118. The teeth 116 are engaged by a pinion 120, which is supported in an enlargement 121 of the housing 105, which is shown as being offset by 90°. A pinion shaft 122 leads to a turning mechanism 123 for turning the nut sleeve 102. The turning mechanism 123 also includes a gear 124 and a three-phase asynchronous motor 125 with clockwise and counterclockwise operation, so that the nut sleeve 102 can be turned in both directions.

Figure 15B:
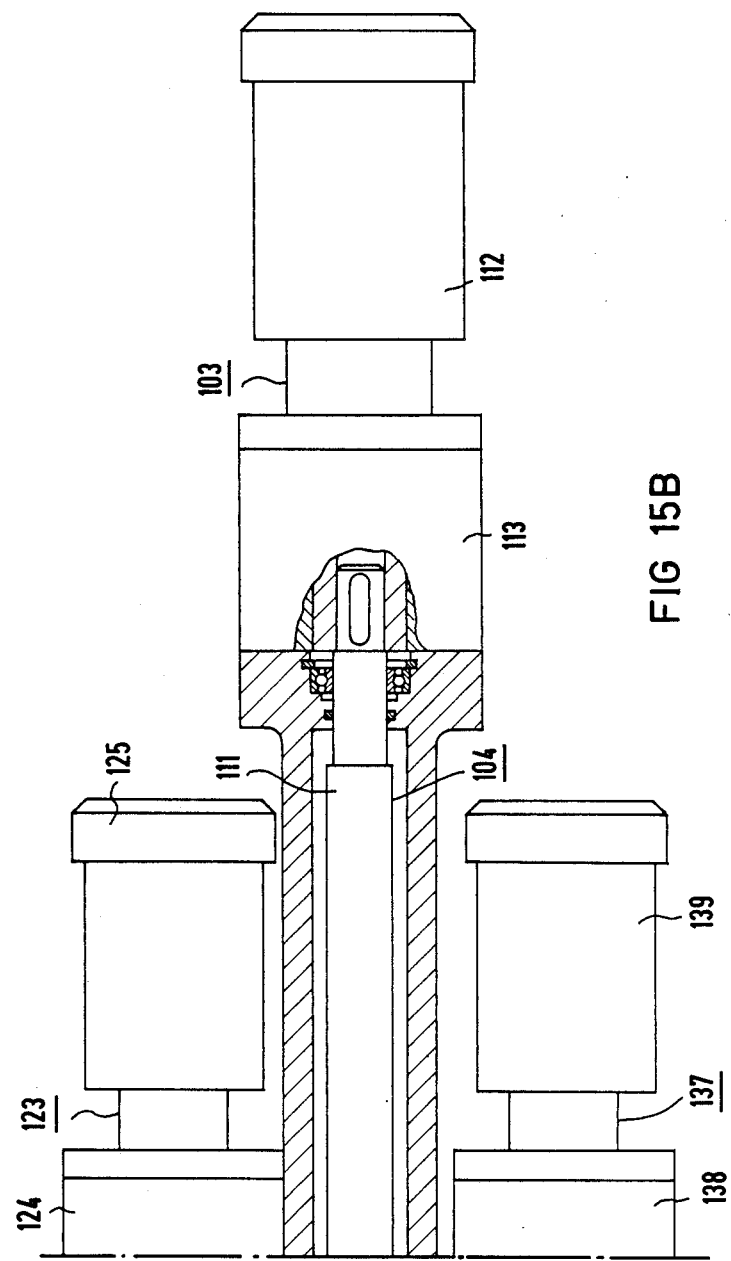
Figures 16, 17:
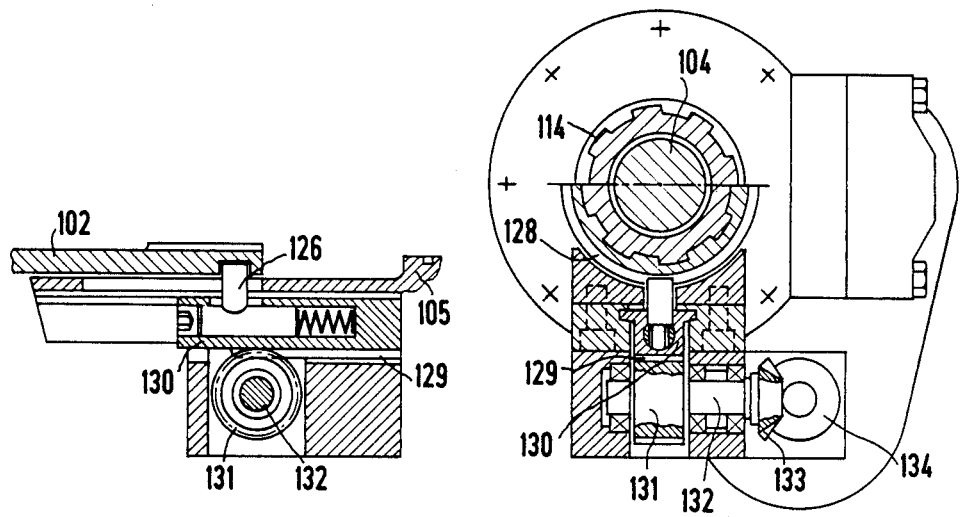
FIGS. 16 and 17 are partly cross-sectional views of the device shown in FIGS. 15A and 15B.

The end of the nut sleeve 102 facing away from a hexagonal socket 124′ has a groove 128 formed in the outer surface thereof. As seen in FIGS. 15, 16 and 17, the groove is engaged by a pin 126 that is secured to a carriage 130 guided within the housing 105. The carriage 130 has teeth 129 on the lower surface thereof, which mesh with a pinion 131. The pinion 131 is connected through a shaft segment 132 to a cone wheel 133. As shown in FIG. 15, a cone wheel 134 meshes with it and has a drive shaft 135 which leads out of the housing 105.

The drive shaft 135 leads to a third turning mechanism 137 having a gear 138 and a reversible electric motor 139, with which the nut sleeve 102 can be adjusted in the direction of the drive shaft 104. In FIG. 15A, the farthest-extended position of the nut sleeve 102 is shown at the top. In this position, it can encompass the sleeve 25. The retracted position is shown at reference numeral 102′ at the bottom of FIG. 15A. In this case, the nut sleeve 102 forms a funnel-like extension of a conical flared portion 137′ of the screw sleeve 101, so that placement of the tool 100 onto the screw 17 is made easier.

There is also a non-illustrated possibility of retracting the nut sleeve 102 with a motor as described, but advancing it with the aid of a moderately strong spring, so that when it is turned slowly it snaps forward without force as soon as the nut sleeve 102 has attained the suitable rotational position relative to the six-sided sleeve 25.

In contrast to the embodiment shown in FIG. 15, a gear having a step-up ratio of, for example, i=1:80 can also be disposed in such a way that it rotates with the drive shaft 111 and acts upon the hollow shaft 115. The high torque of 800 Nm, for example, which is required for tensioning the expansion screw 17 then acts directly between the screw sleeve 101 (four-sided nut) and the nut sleeve 102 (six-sided nut), so that no higher torques need be transferred from the housing 105 into the tool 100 or into the stationary flange 3.

Figure 18:
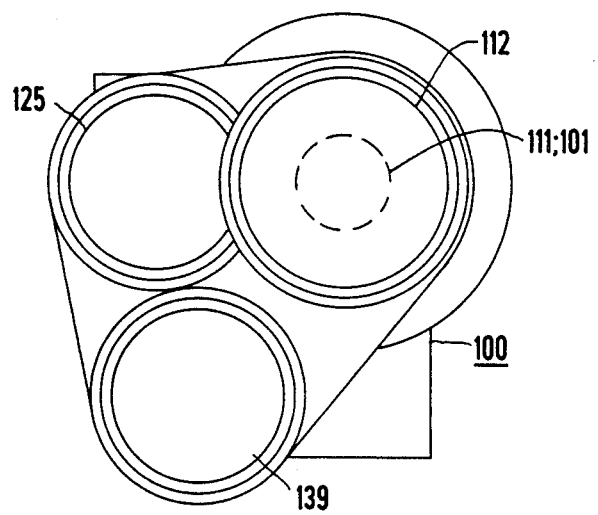
FIG. 18 is an end-elevational view of the device shown in FIGS. 15A and 15B.

In FIG. 18, it can be seen that the combination tool 100 is asymmetrically constructed, since the motors 125 and 139 are disposed on one side (on the left) alongside the middle of the shaft 111 of the screw sleeve 101 As a result, the radial dimension of the flange-screws disposed about a pipeline is reduced on one side (on the right).

The foregoing is a description corresponding in substance to German application Ser. No. P 37 23 386.6, dated July 15, 1987, the International priority of which is being claimed for the instant application, and which is hereby made part of this application. Any material discrepancies between the foregoing specification and the aforementioned corresponding German application are to be resolved in favor of the latter.

We claim:

1. Bolted pipe joint releasable by remote control, comprising a fixed flange and a releasable flange each being disposed at a respective one of two pipe end, a centering aid cooperating with both of said flanges, a seal, and a fastening screw being retained by said releasable flange in a disengaged position and pressing said two flanges together in an engaged position, said fastening screw having first and second threaded regions being successively engaged upon pressing said flanges together, said first threaded a region having a substantially greater pitch than said second threaded region.

2. Bolted pipe joint according to claim 1, wherein said first threaded region is a relatively coarse thread having at least twice the pitch of said second threaded region which is a relatively fine thread.

3. Bolted pipe joint according to claim 1, wherein said two threaded regions have opposing pitch directions.

4. Bolted pipe joint according to claim 2, wherein said coarse thread has an axial thread play of at least 0.5 mm with respect to one of said flanges in which said coarse thread is disposed.

5. Bolted pipe joint according to claim 2, wherein said coarse thread is rolled.

6. Bolted pipe joint according to claim 1, wherein said fastening screw has a shaft portion between said threaded regions in the form of an anti-fatigue shaft.

7. Bolted pipe joint according to claim 6, wherein said anti-fatigue shaft has a thickened portion in the vicinity of said second threaded region, for centering said screw in one of said flanges.

8. Bolted pipe joint according to claim 1, wherein one of said flanges has a threaded bore formed therein in which said first threaded region is engaged, and including a sleeve supported on the other of said flanges having another threaded bore formed therein in which said second threaded region is engaged.

9. Bolted pipe joint according to claim 8, wherein said screw is formed of a different type of material than said one flange and said sleeve, and including an anti-seizing cap formed of the same material as said screw being mounted onto said sleeve.

10. Bolted pipe joint according to claim 8, including a fixed stop limiting screw motion of said sleeve on said second threaded region in a direction away from said first threaded region.

11. Bolted pipe joint according to claim 8, wherein said sleeve has a double internal thread which can be screwed onto both said first and said second threaded regions.

12. Bolted pipe joint according to claim 8, wherein said sleeve and said screw have flat surfaces being differently dimensioned for receiving tools.

13. Bolted pipe joint according to claim 12, wherein said sleeve has a greater number of surfaces than said screw.

14. Bolted pipe joint according to claim 12, wherein said fastening screw has a shaft portion between said threaded regions in the form of an anti-fatigue shaft with a given diameter, and said flat surface of said screw has a blind bore formed in the center thereof and a wrench width at least 2 mm larger than said given diameter.

15. Bolted pipe joint according to claim 1, wherein said releasable flange has a short length with a coarse internal thread preventing said screw from falling out during transportation of said releasable flange.

16. Bolted pipe joint according to claim 1, wherein at least one of said flanges has a rim with protrusions thereon transmitting a screw biasing force exceeding a given required sealing force.

17. Bolted pipe joint according to claim 1, wherein said seal is a piece of pipe having curved sealing surfaces compensating for a radial offset.

18. Bolted pipe joint according to claim 1, wherein said seal is a double cone seal formed of metal.

19. Bolted pipe joint according to claim 1, including a retaining ring fixing said seal to one of said flanges.

20. Bolted pipe joint according to claim 1, wherein said seal is countersunk in one of said flanges.

21. Bolted pipe joint according to claim 1, wherein one of the pipe ends is a stationary pipe end, and including a protruding sealing portion disposed on the stationary pipe end.

22. Bolted pipe joint according to claim 21, wherein said sealing portion forms said centering aid.

23. Bolted pipe joint according to claim 21, wherein said sealing portion is an interchangeable ring or bushing.

24. Bolted pipe joint according to claim 1, wherein said screw is disposed asymmetrically with respect to the axis of the pipe.

25. Bolted pipe joint according to claim 1, wherein said flange has a reduced width in a direction transverse to the plane of an outgoing pipe bend of one of the pipe ends.

26. Bolted pipe joint according to claim 1, wherein one of said flanges is a multiple flange, and including a common suspension strap connecting a plurality of outgoing pipes of one of the pipe ends joined in one plane.

27. Bolted pipe joint assembly releasable by remote control, comprising a plurality of bolted pipe joints, said pipe joints having a fixed common flange and a releasable common flange disposed at a plurality of pipe ends, a centering aid cooperating with both of said flanges, a seal, and a fastening screw disposed between the axes of the pipe ends, said fastening screw being retained by said releasable flange in a disengaged position and pressing said two flanges together in an engaged position, said fastening screw having first and second threaded regions being successively engaged upon pressing said flanges together, said first threaded region having a substantially greater pitch than said second threaded region.

28. Bolted pipe joint releasable by remote control, comprising two flanges each being disposed at a respective one of two pipe ends, a centering aid cooperating with both of said flanges, a seal, a fastening screw pressing said two flanges together, said fastening screw having first and second threaded regions being successively engaged upon pressing said flanges together, said first threaded region having a substantially greater pitch than said second threaded region, one of said flanges having a threaded bore formed therein in which said first threaded region is engaged, and a sleeve supported on the other of said flanges having another threaded bore formed therein in which said second threaded region is engaged, said sleeve having a double internal thread to be screwed onto both said first and said second threaded regions.

29. Bolted pipe joint according to claim 1, wherein said releasable flange has an inner collar and a slit ring with a wedge cross section acting against said inner collar as a backstop for said fastening screw.

* * * * *

UNITED STATES PATENT AND TRADEMARK OFFICE
CERTIFICATE OF CORRECTION

PATENT NO. : 4,953,580

DATED : September 4, 1990

INVENTOR(S) : Schabert et al

It is certified that error appears in the above-identified patent and that said Letters Patent is hereby corrected as shown below:

In the Title Page, Item (73)

"Assignees: Siemens Aktiengesellschaft, Hanover;
Deutsche Gesellschaft für
Wiederaufarbeitung von
Kernbrennstoffen mbH, Munich,
both Fed. Rep. of Germany"

should read:

- - Assignee: Deutsche Gesellschaft für
Wiederaufarbeitung von
Kernbrennstoffen mbH, Hannover,
Fed. Rep. of Germany - -

Signed and Sealed this

Seventh Day of April, 1992

Attest:

HARRY F. MANBECK, JR.

Attesting Officer

Commissioner of Patents and Trademarks